C. B. OSBORNE.
ADHESIVE TEST FOR OILS AND THE LIKE.
APPLICATION FILED MAR. 12, 1913.
1,120,624.
Patented Dec. 8, 1914.
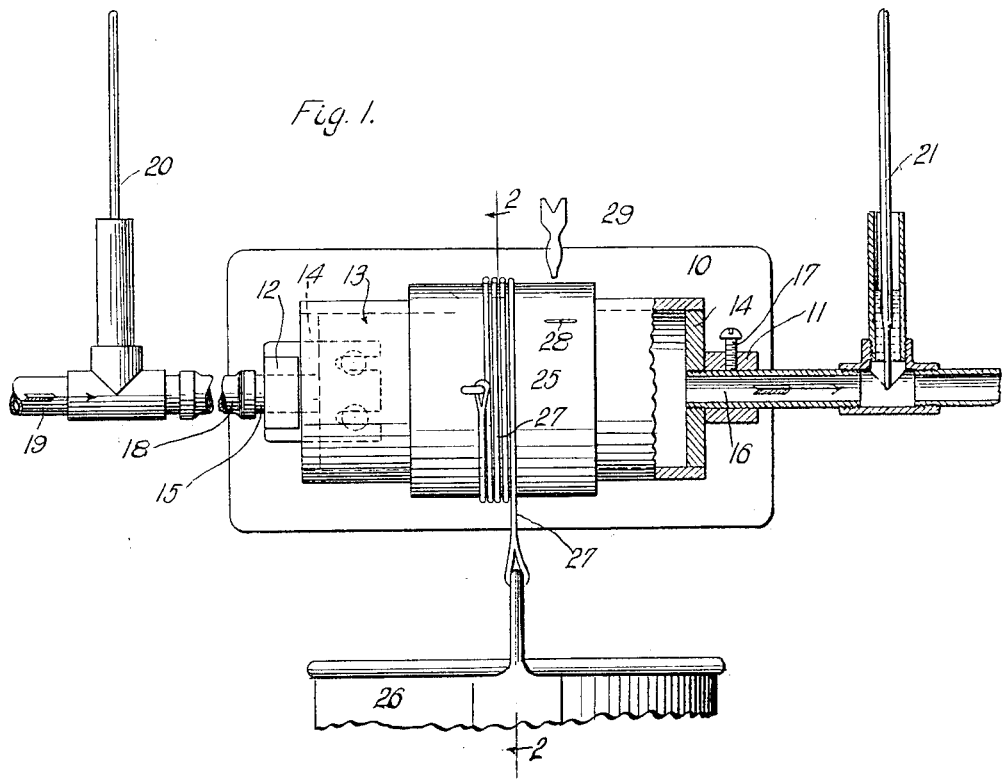
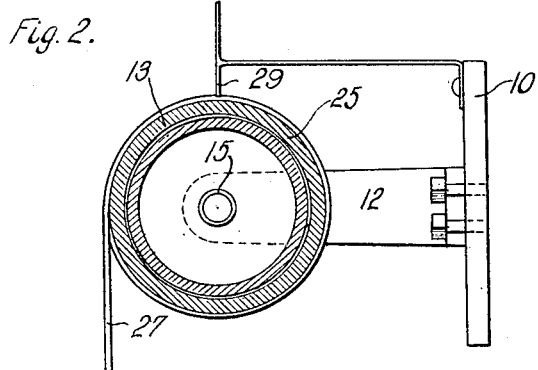
Witnesses
Elwood H. Barbelew
F. A. Danford
Inventor
Clarence B. Osborne
by James T. Berkelew
his Attorney.

UNITED STATES PATENT OFFICE.

CLARENCE B. OSBORNE, OF SACRAMENTO, CALIFORNIA.

ADHESIVE TEST FOR OILS AND THE LIKE.

1,120,624.　　　　Specification of Letters Patent.　　Patented Dec. 8, 1914.

Application filed March 12, 1913. Serial No. 753,780.

*To all whom it may concern:*

Be it known that I, CLARENCE B. OSBORNE, a citizen of the United States, residing at Sacramento, in the county of Sacramento, State of California, have invented new and useful Improvements in Adhesive Tests for Oils and the like, of which the following is a specification.

This invention relates to a method and apparatus for testing and determining the adhesive qualities of liquids; its present application being for testing and determining the adhesiveness of oils used for road construction.

Oils which otherwise appear to be of the same or very similar qualities, for instance of the same viscosity or of the same specific gravity, often have greatly varying adhesive qualities; and the value of oil, for road construction, depends greatly upon the amount of adhesion it possesses.

It will be understood that my method may be applied to any liquid whose adhesiveness is wished to be determined; but I hereinafter describe my method as applied particularly to the determination of adhesiveness of road oils, and describe a form of apparatus specifically adapted thereto.

In its broad fundamentals, my method consists in measuring the energy or force required to produce relative movement (measuring the resistance to that movement) between two surfaces connected by, and in surface contact with, a thin film of liquid to be tested.

In practice, I prefer to use two concentric cylindrical surfaces, one rotatable with reference to the other, in intimate contact with opposite surfaces of a thin film of oil formed between them; and a known force being applied to cause the relative rotation of the two cylindrical surfaces, the observation of the velocity of relative movement gives all the data necessary for determining accurately the relative adhesiveness of the oil being tested. It is this specific method I explain in detail in the following specification; and I illustrate the preferred specific form of apparatus in the accompanying drawings, in which:

Figure 1 is a front elevation of my apparatus, with parts in section. Fig. 2 is a section taken on line 2—2 of Fig. 1.

In the drawings 10 may designate a suitable base upon which two pedestal bearings 11 and 12 may be carried, the bearing 12 being preferably removable, as indicated in the drawings. Between these two bearings 11 and 12 there is carried a hollow cylinder 13, turned accurately to a true cylindrical outer surface. The ends of the cylinder are closed by suitable plugs 14, and an inlet pipe 15 and an outlet pipe 16 connect with the interior of the hollow cylinder through the plugs 14. The pipes 15 and 16 are carried in the bearings 12 and 11; and a set screw 17 may be used to prevent rotation of the pipe 16 and of the hollow cylinder 13. Connection with the inlet pipe 15 is preferably through a rubber tube 18, or any other connection which may be easily removed so that the bearing 12 may be removed from its position on base plate 10.

Water, or any other suitable medium, is fed through the induction pipe 19, its temperature being measurable by a thermometer 20 which may be placed in the position shown. The water passes through the interior of cylinder 13 and out through outlet pipe 16, passing by another thermometer 21 where its temperature may again be measured. To facilitate my procedure the apparatus, and particularly the film of oil being tested, should be kept at a uniform temperature throughout the test; and I have adopted as a convenient standard a temperature of 77 degrees F.

Loosely fitting around the hollow cylinder 13 is a rotatable ring 25, the difference between the interior radius of the ring 25 and the exterior radius of the cylinder 13 being the thickness of the film of oil to be tested. For road oils and the like I have found a thickness of film of two one-thousandths of an inch to be satisfactory and efficient; but this thickness may be varied to suit the character of materials to be tested and also to use the character of test required. The ring 25 is rotated by a suitable weight 26 suspended from a cord 26 passing around the ring 25. A small mark 28 on the ring 25, in conjunction with a pointer 29, serves to indicate whole revolutions of ring 25.

In carrying out my preferred method I first coat the exterior of cylinder 13 and interior of ring 25 with the oil or other liquid to be tested, and then place the ring 25 in position on the cylinder. There is then a thin film of liquid between the cylinder and ring and in intimate surface contact with each of them. The standard temperature is then attained and the weight 26 attached. The ring is started to rotate under the influence of the weight, which rotation takes place with very uniform velocity, and the time is noted for one or more complete revolutions of the ring. The time period observed is a direct measure of the relative quality of adhesiveness of the oil (or, at least, is a measure which enables me to specify a certain definite test which should be passed by an oil of the quality desired;) providing all the other conditions of the test are standard. These conditions include the thickness and area of the oil film, the temperature and the force acting to produce motion, all of which may be varied. But for purposes of ready comparison I standardize these factors so that the time period may be used directly as a measure of adhesiveness.

Having described my invention, I claim:

1. Apparatus for the herein described method of determining adhesiveness of liquids, comprising a stationary cylinder and a rotatable ring in concentric arrangement with a thin space between their cylinder surfaces for reception of a thin film of the liquid to be tested, means to maintain the cylinder and ring at a constant temperature, and means for applying a rotative force to the ring.

2. Apparatus for the herein described method of determining adhesiveness of liquids, comprising a stationary hollow cylinder and a rotatable ring loosely fitting over the cylinder, the space between the cylinder and ring being adapted to receive a thin film of the liquid in contact with both cylinder and ring, means for passing heating liquid at a constant temperature through the hollow cylinder, and means including a weight and cord for rotating the ring.

In witness that I claim the foregoing I have hereunto subscribed my name this 3rd day of March, 1913.

CLARENCE B. OSBORNE.

Witnesses:
J. H. SMALL,
SAMUEL S. STAHL.

Copies of this patent may be obtained for five cents each, by addressing the "Commissioner of Patents, Washington, D. C."